United States Patent Office 2,756,254
Patented July 24, 1956

2,756,254

METHOD OF PREPARING DIPHENYL ACETIC ACID

George Kesslin, New York, N. Y., assignor to Kay-Fries Chemicals, Inc., West Haverstraw, N. Y., a corporation of New York No Drawing. Application September 28, 1951,
Serial No. 248,881

6 Claims. (Cl. 260—515)

This invention relates to improvements in methods of preparing diphenyl acetic acid, and, more particularly, to a one-step method employing glyoxylic acid as a starting material. This application is a continuation-in-part of my prior application, Ser. No. 137,033, filed January 5, 1950, for Method of Preparing Diphenyl Acetic Acid, now abandoned, which application is a division of the prior joint application of Herbert Elkinton, George Kesslin, and Leonard Nicholl, Serial No. 92,968, filed May 12, 1949, for Methods of Preparing Diphenyl Acetic Acid, now Patent No. 2,517,856, of August 8, 1950, for Method of Preparing Diphenyl Acetic Acid.

Diphenyl acetic acid is an important intermediate or starting compound for the preparation of a number of special chemicals having particular utility as bacteriostats in the treatment of malaria and like diseases.

The present application is directed to the process of forming diphenyl acetic acid, directly in a one-step treatment, by reacting benzene with glyoxylic acid or its hydrate, in the presence of chlorsulfonic acid as a catalyst.

It is, therefore, among the features of novelty and advantage of the present invention to provide a novel method for the preparation of diphenyl acetic acid by the direct reaction of glyoxylic acid, or its hydrate, and benzene, in the presence of chlorsulfonic acid as a catalyst.

In the process herein, glyoxylic acid hydrate is the equivalent of glyoxylic acid for the preparation of diphenyl acetic acid.

In carrying out the process herein, one mol of glyoxylic acid, or its hydrate, is reacted directly with two mols of benzene, in the presence of an excess of benzene as a solvent, using chlorsulfonic acid as a catalyst, according to the following equation:

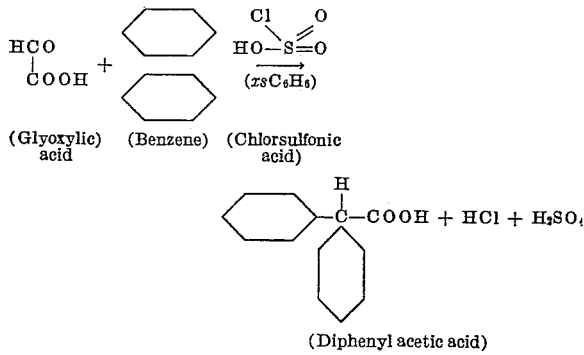

The glyoxylic acid which is used as a starting material for this reaction may be obtained from any source, and desirably by heating chloral with water.

In carrying out the reaction, an excess of benzene is used, and the diphenyl acetic acid formed is dissolved therein. In the reaction vessel, the sulfuric acid formed by the breakdown of the chlorsulfonic acid separates out as a bottom layer under the diphenyl acetic acid-benzene layer, which is decanted off, and washed with a solution of caustic soda to form the sodium salt of diphenyl acetic acid in aqueous solution. The aqueous solution of the sodium salt separates out from the benzene as a separate layer. The aqueous diphenyl acetic acid sodium salt layer is separated from the washed benzene layer, and is then acidified to reform the diphenyl acetic acid, which precipitates out of solution. The separated diphenyl acetic acid is then recovered and purified in the usual manner.

The following example, using glyoxylic acid hydrate as a starting material, is illustrative of the process herein:

*Materials*

18.6 gms. glyoxylic acid hydrate
162.0 gms. chlorsulfonic acid
200 cc. benzene

*Procedure*

The chlorsulfonic acid was added, with agitation, to the mixture of benzene and glyoxylic acid hydrate at a reaction temperature of 20–30° C., over a 2-hr. period. Agitation was then continued at the same temperature for 1½ hrs. longer. The reaction temperature was then raised to 50° C., and kept there for one hour longer. The entire reaction mixture was then quenched in 1000 cc. of cold water, and the excess benzene removed by distillation. The aqueous acid solution was then decanted from the gummy crude, and the crude was taken up into solution with a mixture of 20 gms. of NaOH in 300 cc. of $H_2O$. After the crude dissolved as the sodium salt, the solution was extracted with 100 cc. of toluene. The residual aqueous solution was then treated with permanganate and carbon treated to improve the color of the product. The diphenyl acetic acid was then precipitated out of the solution by adding concentrated sulfuric acid to a red test on alkali test paper. The product was then filtered and dried in the oven at 105° C.

*Results*

Weight of dried crude
diphenyl acetic acid_____ 31 gms. (analyzing 93.2% by titration).
Theory _____ 43.0 gms. diphenyl acetic acid.
Yield _____ 67.2% of theory.

By two recrystallizations from toluene, there was obtained 5.5 gms. of a product with a melting point of 141.5°–143.5° C., and analyzing 100% diphenyl acetic acid by titration.

A mixed melting point determination with pure diphenyl acetic acid showed no depression of the melting point—142.0° C.–144.5° C.

It will now be appreciated that there has been disclosed a novel method for the direct preparation of diphenyl acetic acid from glyoxylic acid and its hydrate, by reaction with benzene in the presence of chlorsulfonic acid as a catalyst, and without requiring the use of intermediate solvents or treating steps.

What is claimed is:

1. The method of preparing diphenyl acetic acid, in a single step, comprising reacting one mol of glyoxylic acid and two mols of benzene, in an excess of benzene as a solvent, and in the presence of a catalyst consisting of chlorsulfonic acid whereby to form diphenyl acetic acid.

2. The method of preparing diphenyl acetic acid in a single step, comprising reacting one mol of glyoxylic acid and two mols of benzene, in an excess of benzene, and in the presence of chlorsulfonic acid as a catalyst to form diphenyl acetic acid dissolved in the excess of benzene and a subjacent layer of sulfuric acid, decanting the diphenyl acetic acid-benzene layer, washing with caustic solution to form an aqueous solution of an alkali salt of diphenyl acetic acid and a supernatant washed benzene layer, separating the aqueous caustic diphenyl acetic acid layer, and acidifying, whereby to precipitate diphenyl acetic acid.

3. The improved method of preparing diphenyl acetic acid comprising reacting glyoxylic acid and benzene in the presence of chlorsulfonic acid as a catalyst.

4. The improved method of preparing diphenyl acetic acid comprising reacting glyoxylic acid and benzene, in reactive amounts, at room temperature, in the presence of chlorsulfonic acid as a catalyst.

5. The improved method of preparing diphenyl acetic acid comprising reacting one mol of glyoxylic acid hydrate and two mols of benzene, at room temperature, in an excess of benzene, and in the presence of chlorsulfonic acid as a catalyst.

6. The improved method of preparing diphenyl acetic acid comprising preparing a bath of one mol of glyoxylic acid hydrate and two mols of benzene, in an excess of benzene, adding catalytic amounts of chlorsulfonic acid, at room temperature, and over a two-hour period, to the reaction bath; agitating the bath for one and one-half hours longer; raising the reaction temperature to 50° C., and heating at this temperature for one hour.

References Cited in the file of this patent

UNITED STATES PATENTS 2,517,856      Elkinton et al. _____ Aug. 8, 1950

OTHER REFERENCES

Boettiger: Archiv der Pharm., vol. 233, pp. 111 to 118 (1895).

Ostromisslenski: Ber. Deut. Chem., vol. 41, pp. 3029 to 34 (1908).

Rueggeberg et al.: Ind. and Eng. Chem., vol. 38, pp. 211–14 (1946).

Rueggeberg et al.: Ind. and Eng. Chem., vol. 39, pp. 868–70 (1947).

Rueggeberg et al.: Ind. and Eng. Chem., vol. 39, page 1683 (1947).

Vieles et al.: Bull. Soc. Chim. de France, vol. 1947, pp. 247 to 51.